United States Patent [19]
Sprague

[11] 4,437,106
[45] Mar. 13, 1984

[54] METHOD AND MEANS FOR REDUCING ILLUMINATION NULLS IN ELECTRO-OPTIC LINE PRINTERS

[75] Inventor: Robert A. Sprague, Saratoga, Calif.

[73] Assignee: Xerox Corporation, Stamford, Conn.

[21] Appl. No.: 299,697

[22] Filed: Sep. 8, 1981

[51] Int. Cl.³ .................. G01D 15/14; G02F 1/01
[52] U.S. Cl. .................. 346/160; 346/107 R; 350/356
[58] Field of Search .............. 346/108, 107 R, 160; 350/356; 358/300, 302; 354/5

[56] References Cited

U.S. PATENT DOCUMENTS 4,281,904 8/1981 Sprague et al. ............... 350/356

Primary Examiner—Thomas H. Tarcza

[57] ABSTRACT

The imaging optics for an electro-optic line printer include means for coupling light from illuminated picture elements into the regions adjacent such picture elements, so that the cross line motion of the recording medium and/or the limited resolving power of the printing process may be relied upon to reduce, if not eliminate, illumination nulls. To accomplish that, one embodiment employs a tilted phase step in or near the Fourier transform plane of the imaging optics to convert each of the illuminated picture elements into a dual spot diffraction pattern which is tilted or canted relative to the cross line motion of the recording medium. In another embodiment there is a light scattering element which is positioned just in front of the image plane to scatter light from the illuminated picture elements into the null regions without otherwise materially affecting the image. Due to the random phase relationship of the scattered light, any secondary optical interference pattern created thereby has such a high spatial frequency that it is not resolvable by the printing process.

9 Claims, 9 Drawing Figures

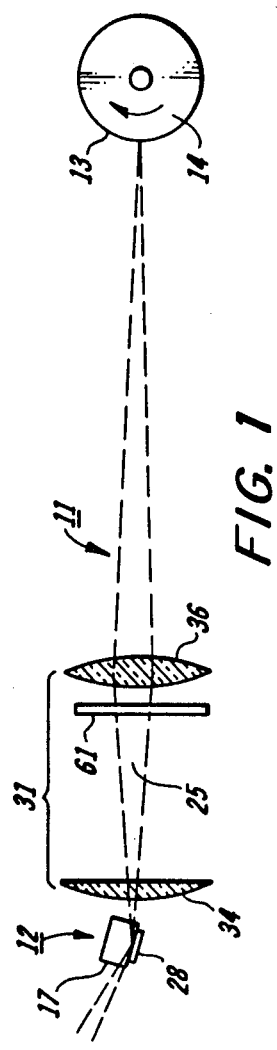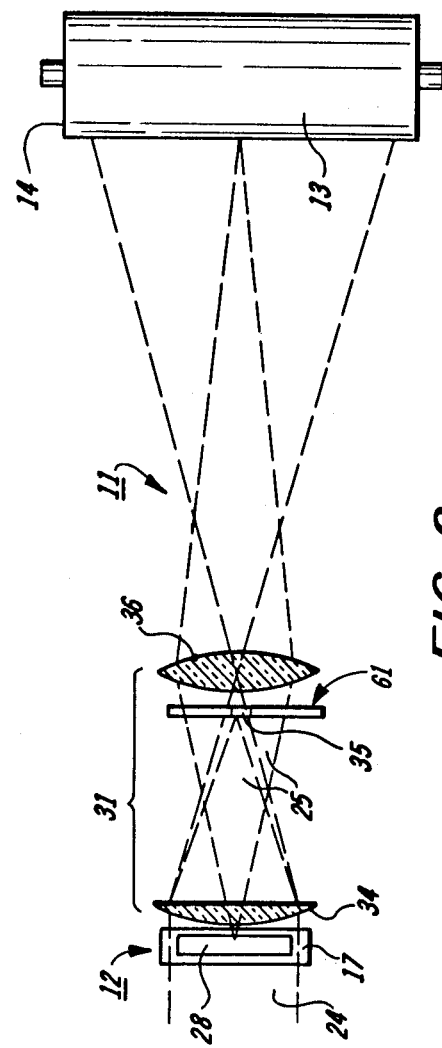

METHOD AND MEANS FOR REDUCING ILLUMINATION NULLS IN ELECTRO-OPTIC LINE PRINTERS

FIELD OF THE INVENTION

This invention relates to electro-optic line printers and, more particularly, to methods and means for reducing illumination nulls between adjacent picture elements printed by such a line printer.

BACKGROUND OF THE INVENTION

As is known, an electro-optic element having a plurality of individually addressable electrodes may be employed as a multigate light valve for an electro-optic line printer. See, for example, U.S. Pat. No. 4,281,904 which issued Aug. 4, 1981 on an application of R. A. Sprague et al., for a "TIR Electro-Optic Modulator with Individually Addressable Electrodes". Also, see "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

Substantial progress has been made in developing multigate light valves of the foregoing type and in applying such light valves to electro-optic line printing. More particularly, a copending and commonly assigned U.S. patent application of R. A. Sprague, which was filed Sept. 17, 1980 under Ser. No. 187,911 now U.S. Pat. No. 4,389,659 on an "Electro-Optic Line Printer," shows that an image represented by a serial input data stream may be printed on a standard photosensitive recording medium through the use of a multigate light valve that is illuminated by a more or less conventional light source. That disclosure is of interest primarily because it teaches input data sample and hold techniques for minimizing the output power required of the light source. Furthermore, a copending and commonly assigned U.S. patent application of W. D. Turner, which was filed Sept. 17, 1980 under Ser. No. 187,936 now U.S. Pat. No. 4,396,252 on "Proximity Coupled Electro-Optic Devices," reveals that the electrodes and the electro-optic element of a multigate light valve may be physically distinct components which are pressed or otherwsie firmly held together to achieve "proximity coupling." Another copending and commonly assigned U.S. patent application of R. A. Sprague et al., which was filed Sept. 17, 1980 under Ser. No. 188,171 now U.S. Pat. No. 4,367,925 on "Integrated Electronics for Proximity Coupled Electro-Optic Devices," shows that it is relatively easy to make the necessary electrical connections to the many electrodes of a typical proximity coupled multigate light valve if the electrodes are fromed by suitably patterning a metallization layer of, say, a VLSI silicon electrode driver circuit. A further copending and commonly assigned U.S. patent application of W. D. Turner et al., which was filed Sept. 17, 1980 under Ser. No. 187,916 on "Differential Encoding for Fringe Field Responsive Electro-Optic Line Printers," teaches that the number of electrodes required of a multigate light valve to enable an electro-optic line printer to achieve a given resolution is reduced by a factor of two if the input data is differentially encoded. Moreover, another copending and commonly assigned U.S. patent application of R. A. Sprague et al., which was filed Mar. 30, 1981 under Ser. No. 248,939 on "Multilayer Interleaved Electrodes for Multigate Light Valves," shows that increased electro-optic efficiency and improved resolution may be obtained from a multigate light valve by using two or more layers of interleaved electrodes. Still another copending and commonly assigned U.S. patent application of R. A. Sprague, which was filed Mar. 30, 1981 under Ser. No. 249,057 on "Multigate Light Valve for Electro-Optic Line Printers Havine Non-Telecentric Imaging Systems," describes a converging electrode geometry which simplifies the imaging optics that are required to apply such a light valve to electro-optic line printing or the like. And, yet another copending and commonly assigned U.S. patent application of R. A. Sprague, which was filed Aug. 3, 1981 under Ser. No. 289,447 on "Non-Uniformity Compensation for Multigate Light Valves," provides a technique for reducing data independent variations in the optical output of a multigate light valve.

Despite the advances that have been made, prior electro-optic line printers have characteristically exhibited undesireable illumination nulls between adjacent picture elements within any given line of the printed image. Unfortunately, these nulls produce discontinuities which may materially degrade the image quality. Moreover, the straightforward techniques for eliminating the nulls, such as by defocussing or blurring the imaging system of the printer, are generally unacceptable because electro-optic line printers rely on coherent imaging.

SUMMARY OF THE INVENTION

In accordance with the present invention, the imaging optics for an electro-optic line printer include means for coupling light from illuminated picture elements into the regions adjacent such picture elements, so that the cross line motion of the recording medium and/or the limited resolving power of the printing process may be relied upon to reduce, if not eliminate, the illumination nulls. To accomplish that, one embodiment employs a tilted phase step in or near the Fourier transform plane of the imaging optics to convert each of the illuminated picture elements into a dual spot diffraction pattern which is tilted or canted relative to the cross line motion of the recording medium. In another embodiment there is a light scattering element just in front of the image plane to scatter light from the illuminated picture elements while providing such a high spatial frequency for any interference pattern created by the scattered light that such pattern is not resolvable by the printing process.

BRIEF DESCRIPTION OF THE DRAWINGS

Still other features and advantages of this invention will become apparent when the following detailed description is read in conjunction with the attached drawings, in which:

FIG. 1 is a schematic side view of an electro-optic line printer having imaging optics with a tilted phase step to carry out the present invention;

FIG. 2 is an enlarged bottom plan view of a portion of the line printer shown in FIG. 1;

DETAILED DESCRIPTION OF THE ILLUSTRATED EMBODIMENTS

Figure 3:
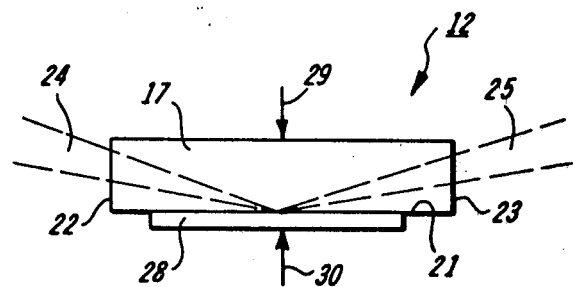
FIG. 3 is an enlarged side view of a TIR multigate light valve.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIGS. 1 and 2, there is an electro-optic line printer 11 having a fringe field responsive multigate light valve 12 for printing an image of a photosensitive recording medium 13. As shown, the recording medium 13 is a photoconductively coated drum 14 which is rotated (by means not shown) in the direction of the arrow 15. Nevertheless, it will be evident that there are other xerographic and non-xerographic recording media that could be used, including photoconductively coated belts and plates, as well as photosensitive films and coated papers. Thus, in the generalized case, the recording medium 13 should be visualized as being a photosensitive medium which is exposed while advancing in a cross line or line pitch direction relative to the light valve 12.

Figure 4:
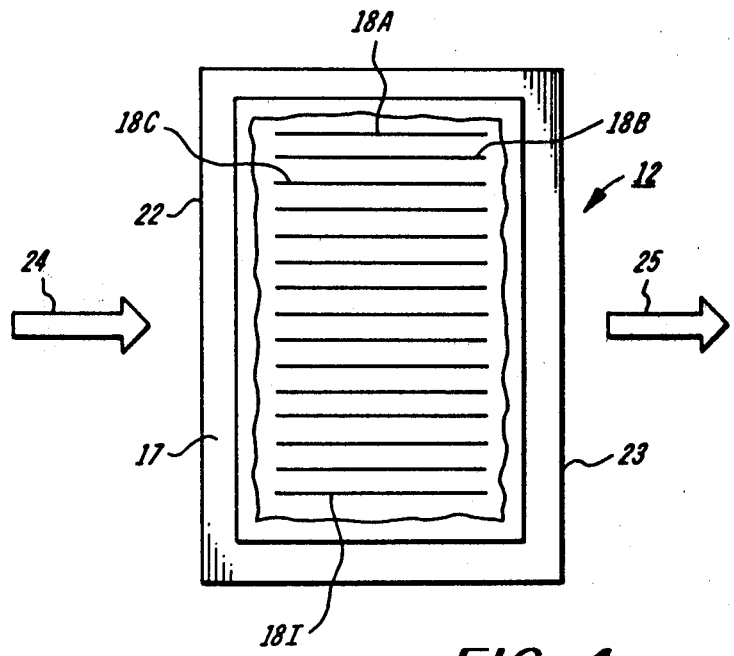
FIG. 4 is an enlarged, cut-away, bottom view of the light valve shown in FIG. 3 to illustrate its individually addressable electrodes.

As best illustrated in FIGS. 3 and 4, the light valve 12 comprises an optically transparent electro-optic element 17 and a plurality of individually addressable electrodes 18a-18i. The most promising electro-optic materials for such a device presently appear to be LiNbO$_3$ and LiTaO$_3$, but there are others which warrant consideration, including BSN, KDP, KD$^x$P, Ba$_2$NaNb$_5$O$_{15}$ and PLZT. In this particular embodiment, the light valve 12 is operated in a TIR mode. Thus, the electro-optic element 17 is suitably a y-cut crystal of, say, LiNbO$_3$ having an optically polished reflecting surface 21 extending between opposed, optically polished input and output faces 22 and 23, respectively. Typically, each of the electrodes 18a-18i is 1-30 microns wide, and the interelectrode gap spacing is 1-30 microns.

Referring to FIGS. 1-4 for a brief review of the operation of the light valve 12, it will be seen that a sheet-like collimated light beam 24 from a suitable source, such as a laser (not shown), is transmitted through the input face 22 of the electro-optic element 17 at a grazing angle of incidence relative to the reflecting surface 21 (i.e., an angle no greater than the critical angle of incidence for total internal reflectance from that surface). The input beam 24 is laterally expanded (by means not shown) so that it more or less uniformly illuminates substantially the full width of the electro-optic element 17 and is brought to a wedge shaped focus (by means also not shown) on the reflecting surface 21 approximately midway through the electro-optic element 17. Accordingly, the input beam 24 is totally internally reflected from the reflecting surface 21 to provide an output beam 25 which exits from the electro-optic element 17 through its output face 23.

The phase front or the polarization of the output beam 25 is spatially modulated in accordance with the data applied to the electrodes 18a-18i. More particularly, if the data creates a voltage drop between any adjacent pair of electrodes, such as the electrodes 18b and 18c, a corresponding fringe field is coupled into the electro-optic element 17, thereby producing a localized variation in its refactive index. To efficiently couple such fringe fields into the electro-optic element 17, the electrodes 18a-18i are supported on or very near the reflecting surface 21 thereof. Indeed, as shown, the electrodes 18a-18i preferably are deposited on a suitable substrate, such as a VLSI silicon circuit 28, which is pressed or otherwise firmly held against the electro-optic element 17, as indicated by the arrows 29 and 30, to maintain the electrodes 18a-18i in contact with, or at least closely adjacent, the reflecting surface 21. The advantage of this construction is that the VLSI circuit 28 may be used to make the necessary electrical connections to the electrodes 18a-18i. Alternatively, however, the electrodes 18a-18i could be desposited on the reflecting surface 21 of the electro-optic element 17.

For illustrative purposes it has been assumed that the phase front of the output beam 25 is spatially modulated in accordance with the data applied to the electrodes 18a-18i. Accordingly, Schlieren central dark field or bright field imaging optics are used to convert the phase front modulation of the output beam 25 into a correspondingly modulated intensity profile and to supply any magnification that may be needed to obtain an image of the desired size. More particularly, as shown, there are central dark field imaging optics 31 comprising a field lens 34, a central stop 35, and an imaging lens 36. The field lens 34 is optically aligned between the output face 23 of the electro-optic element 17 and the stop 35 to focus substantially all of the zero order diffraction components of the output beam 25 onto the stop 35. However, the higher order diffraction components of the output beam 25 scatter around the stop 35 and are collected by the imaging lens 36 which, in turn, focuses them on the recording medium 13 to provide an intensity modulated image of the light valve 12.

Of course, if the input beam 24 is polarized (by means not shown), the polarization of the output beam 25 will be spatially modulated by the light valve 12 in accordance with the data applied to the electrodes 18a-18i. In that event, a polarization analyzer (also not shown) may be used to convert the spatial polarization modulation of the output beam 25 into a correspondingly modulated intensity profile. Accordingly, to generically cover the alternatives, the phase front or polarization modulation of the output beam 25 will be referred to as "p-modulation" and the read out optics 31 will be described as "p-sensitive imaging optics."

Figure 5:
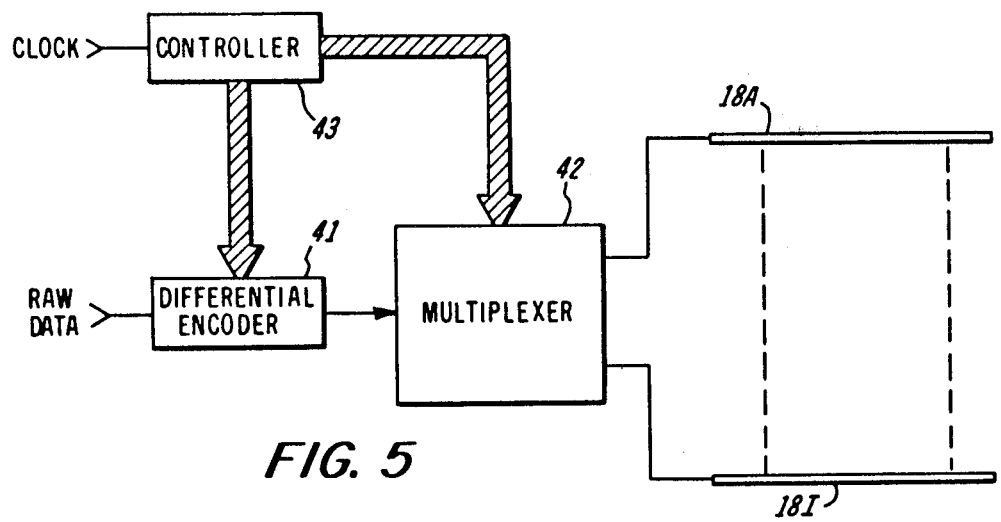
FIG. 5 is a simplified block diagram of a system for applying differentially encoded input data samples to the electrodes of the light valve shown in FIG. 4.

Referring to FIGS. 4 and 5, it will be noted that each of the electrodes 18a-18i is individually addressable. Therefore, to print an image, differentially encoded data samples for successive lines of the image are sequentially applied to the electrodes 18a-18i. As a matter of definition, each differentially encoded data sample, other than the first sample for each line of the image, has a magnitude which differs from the magnitude of the previous differentially encoded sample by an amount corresponding to the magnitude of a particular input data sample. The first differentially encoded sample for each line is referenced to a predetermined potential, such as ground. Thus, when the differentially encoded data samples for any given line of the image are applied to the electrodes 18a–18i, the picture elements for that line are faithfully represented by the electrode-to-electrode voltage drops.

To supply the differentially encoded data samples, serial input data samples representing adjacent picture elements for successive lines of an image are applied to a differential encoder 41 at a predetermined data rate. The encoder 41 differentially encodes these input samples on a line-by-line basis, and a multiplexer 42 ripples the encoded data samples onto the electrodes 18a–18i at a ripple rate which is matched to the data rate. A controller 43 synchronizes the encoder 41 and the multiplexer 42. Of course, the input data may be buffered (by means not shown) to match the input data rate to any desired ripple rate.

Alternatively, a set of ground plane electrodes (i.e., not shown, but defined as being electrodes referenced to the same voltage level as the raw input data samples) could be interleaved with the individually addressable electrodes, thereby avoiding the need for differential encoding. As a general rule, however, the advantages of reducing the number of electrodes required to achieve a given resolution justify the additional circuitry needed for differential encoding.

Figure 6:
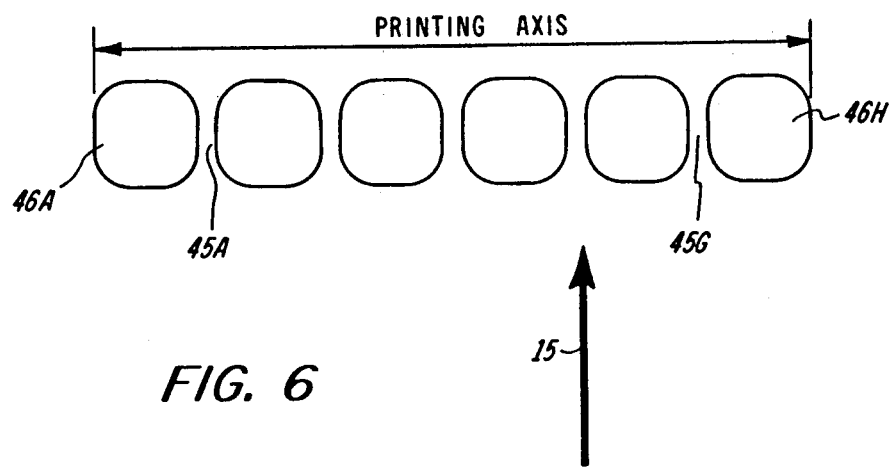
FIG. 6 is a schematic diagram of a line image generated by a conventional electro-optic line printer.

Summarizing the foregoing it will be understood that each adjacent pair of electrodes, such as the electrodes 18b and 18c (FIG. 4), cooperates with the electro-optic element 17 and the readout optics 31 to effectively define a local modulator for creating a picture element at a unique, spatially predetermined position along each line of an image. However, due to the coherent nature of the optics, the printer 11 as described up to this point would suffer from the disadvantage of prior electro-optic line printers of having illumination nulls or "blind spots" 45a–45g (FIG. 6) between the adjacent picture elements 46a–46h for each such line. As will be appreciated, these nulls tend to degrade the quality of the printed image, particularly since they align from line-to-line lengthwise of the image to form resolveable stripes.

In accordance with the present invention, the imaging optics include means for coupling light from the individual modulators of the light valve 12 into the areas on the recording medium 13 which surround the spatially predetermined positions for the picture elements 46a–46h. Alternative embodiments of the invention are described hereinbelow, with like reference numerals being used throughout to identify like parts.

Figure 7:
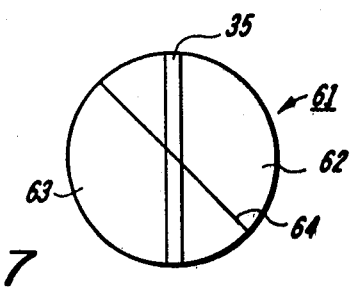
FIG. 7 is an enlarged front view of the phase plate for the imaging optics of the line printer shown in FIG. 1.
Figure 8:
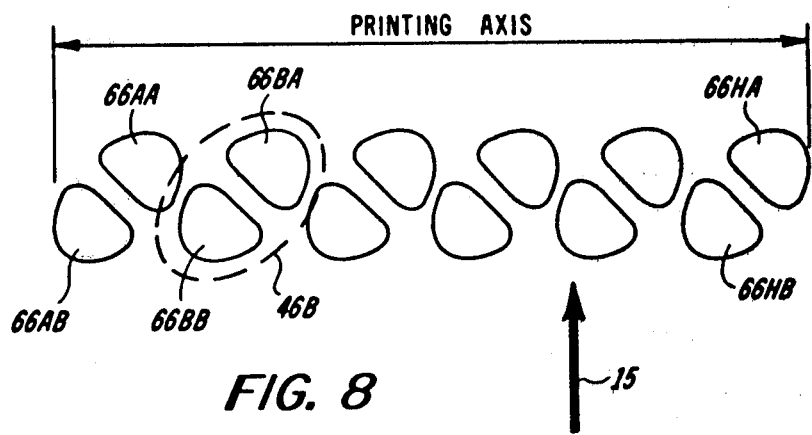
FIG. 8 is a schematic diagram of a line image generated by the line printer shown in FIG. 1.

Referring to FIGS. 1, 2 and 7 for a discussion of the invention as applied to the printer 11, it will be seen that the imaging optics 31 comprise a generally circular optical phase plate 61 having two semi-circular phase delay sections 62 and 63 which are joined to create a phase step 64 of approximately 180 degrees. The phase plate 61 is positioned in the Fourier transform plane of the imaging optics 31 (i.e., in the focal plane of the field lens 34) and supports the stop 35 so that the imaging lens 36 focuses diffracted light from the light valve 12 onto the recording medium 13 (i.e., the image plane for the light valve 12). In effect, the phase plate 61 creates a spatial phase distribution in the Fourier transform plane which causes each of the illuminated picture elements 46a–46h to appear in the image plane (i.e., on the recording medium 13) as a pair of more or less equally illuminated spots of light 66aa, 66ab–66ha, 66hb (FIG. 8). The diameter and the spacing of the diffracted spots 66aa, 66ab–66ha, 66hb are inversely related to the diameter of the input aperture of the imaging lens 36, while the centers of each pair of spots 66aa, 66ab–66ha, 66hb align orthogonally relative to the phase step 64. Thus, the phase step 64 preferably is tilted approximately 45 degrees relative to the axis along which each line is printed (hereinafter referred to as the printing axis) so that the diffraction pattern 66aa, 66ab–66ha, 66hb is tilted at substantially that same angle relative to the printing axis. Under those circumstances, the diffracted spots of light 66aa, 66ab–66ha, 66hb interleave in offset relationship on the recording medium 13 to minimize the illumination nulls. Specifically, the exposure integration that occurs because of the cross line motion of the recording medium 13 enables the spots 66ab–66hb to substantially fill the gaps between the spots 66aa–66ha.

It should be noted that the 180 degree phase step 64 of the phase plate 61 and the 45 degree tilt of that phase step 64 relative to the printing axis are optimum values. Slight variations in either or both of those parameters can be tolerated to the extent that the resulting assymmetry in the intensity or positioning of the diffracted spots 66aa, 66ab–66ha, 66hb do not lead to unacceptable optical interference or to other objectionable exposure defects.

Taking a somewhat broader view of the present invention, it will be understood that most any phase plate which tends to blur the image of the light valve 12 along an axis which is tilted relative to the printing axis will reduce the illumination nulls due to the motion blur which is created by the cross line motion of the recording medium 13. For example, if the light valve 12 were equipped with ground plane electrodes in addition to the individually addressable electrodes 18a–18i, the phase plate 61 could be a tilted cylinder lens. However, this alternative is not particularly useful when the light valve 12 is driven by differentially encoded data because such a cylinder lens will not provide the same blur for both positive and negative field picture elements. At any rate, if the image of the light valve 12 is blurred to reduce the illumination nulls, care must be taken to avoid creating unwanted resolveable optical interference patterns. For that reason, the image of the light valve 12 is preferably blurred along an axis which is tilted 45 degrees or so relative to the printing axis.

If desired, the phase plate 61 may be used not only to reduce the inter-pixel illumination nulls, but also to tailor the energy profiles of the picture elements. Such tailoring may be achieved by imparting a predetermined, non-uniform phase or absorption profile to the phase plate 61 at the expense of sacrificing part of the light which would otherwise be available for printing.

Figure 9:
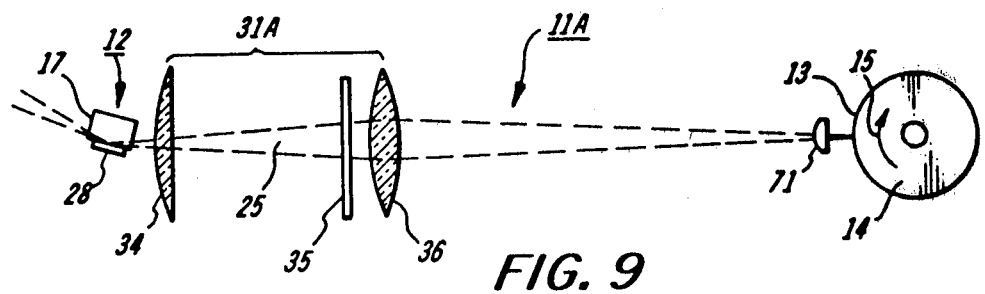
FIG. 9 is a schematic side view of an alternative embodiment of this invention.

Referring now to FIG. 9, another technique for coupling light from the illuminated picture elements 46a–46h (FIG. 6) into the surrounding areas on the recording medium 13 relies on a light scattering element 71, such as a ground glass, which is optically aligned with the imaging lens 36 and positioned just slightly in front of the recording medium 13. The scattering element 71 has a scattering profile selected to blur out the illumination nulls, without otherwise materially affecting the image of the light valve 12. There inherently is some overlapping of the scattered light, but the random phase relationship of the scattered light causes the resulting secondary optical interference pattern to have such a high spatial frequency that is it not resolved by the printing process. The readout optics 31a for the printer 11a do not include a phase plate, but are otherwise identical to the readout optics 31 for the previously described embodiments. Indeed, but for the above-identified differences, the printer 11a is identical to the printer 11.

CONCLUSION

In view of the foregoing it will now be understood that this invention provides methods and means for reducing the inter-pixel illumination nulls that tend to detract from the print quality of electro-optic printers. Furthermore, it will be appreciated that the phase plate that is used to reduce the illumination nulls in accordance with certain embodiments of this invention may also be used to tailor the energy profiles of the illuminated picture elements.

What is claimed is:

1. In an electro-optic line printer having a recording medium; a multigate light valve for printing picture elements in spatially predetermined positions along a printing axis; coherant imaging means optically aligned between said light valve and said recording medium, said imaging means including lens means for imaging said light valve onto said recording medium; and means for advancing said recording medium in a cross line direction relative to said light valve; the improvement comprising additional means within said imaging means for coupling light from illuminated picture elements into areas on said recording medium surrounding the predetermined positions for said illuminated picture elements, thereby reducing illumination nulls between said picture elements.

2. The improvement of claim 1 wherein
said imaging means has a Fourier transform plane, and
said additional means is a phase plate having a spatial phase distribution which is tilted relative to said printing axis, said phase plate being positioned substantially within said Fourier transform plane.

3. The improvement of claim 2 wherein said phase plate has a non-uniform optical profile selected to provide a predetermined energy profile for said picture elements.

4. The improvement of claim 2 wherein said phase distribution is a phase step.

5. The improvement of claim 4 wherein said phase step has a magnitude of approximately 180 degrees.

6. The improvement of claim 2 wherein said spatial phase distribution is tilted approximately 45 degrees relative to said printing axis.

7. The improvement of claim 6 wherein said phase distribution is a phase step of approximately 180 degrees.

8. The improvement of claim 7 wherein said phase plate has a non-uniform optical absorbtion profile selected to provide a predetermined energy profile for said picture elements.

9. The improvement of claim 1 wherein said additional means is a light scattering element located slightly in front of said recording medium, said scattering element having a scattering profile selected to blur out said nulls without otherwise materially affecting the image of said light valve.

* * * * *